May 16, 1967 F. COLE ETAL 3,320,044
METHOD AND APPARATUS FOR MAKING CERAMIC OR VITREOUS ARTICLES
Filed April 29, 1964
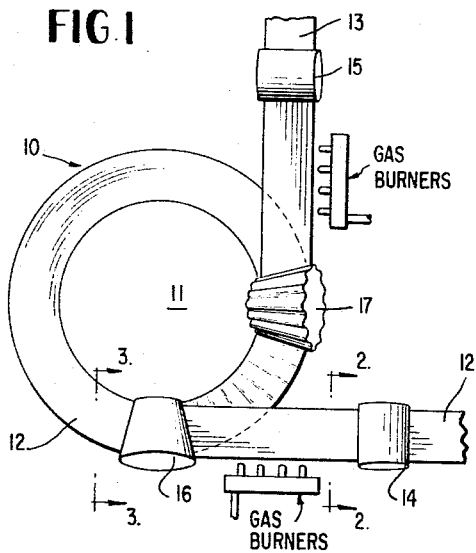
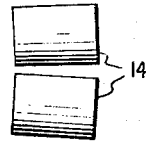
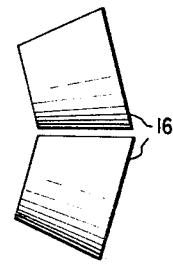
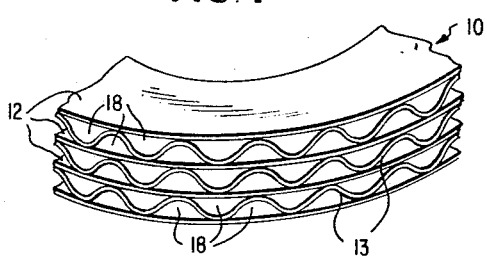
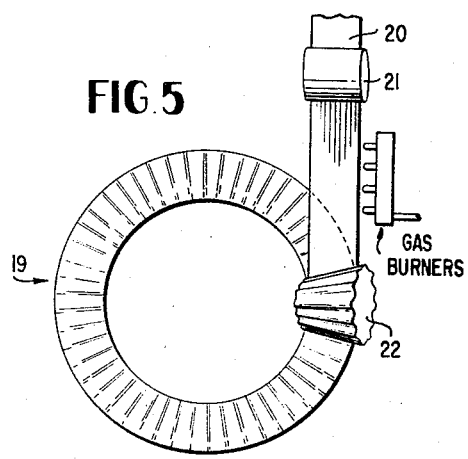
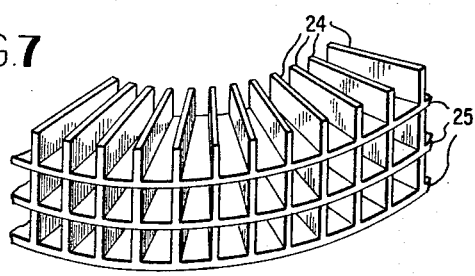
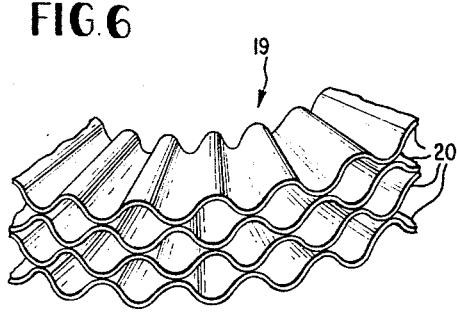
INVENTORS
FELIX COLE
EUGENE L. MODRESKI
ROBERT W. VAN TILBURG
BY
Sughrue, Rothwell, Mion & Zinn
ATTORNEYS United States Patent Office 3,320,044
Patented May 16, 1967

3,320,044
METHOD AND APPARATUS FOR MAKING CERAMIC OR VITREOUS ARTICLES
Felix Cole, West Hartford, Conn., and Eugene L. Modreski, Wellsboro, and Robert W. Van Tilburg, Bradford, Pa., assignors to Corning Glass Works, Corning, N.Y., a corporation of New York
Filed Apr. 29, 1964, Ser. No. 363,557
11 Claims. (Cl. 65—44)

This invention relates to a method and apparatus for making ceramic or vitreous articles, and more particularly, to making honeycomb or cellular ceramic or vitreous articles of the type useful as regenerative heat exchanger bodies.

Regenerative heat exchangers as known in the prior art, employed bodies of material which may be heated by a relatively high temperature fluid and then employed to heat a relatively low temperature fluid. Heat exchangers of this type have recently been employed in conjunction with gas turbines, notably for automotive applications, to recover heat from the gases leaving the turbine and release that heat into the gases entering the combustion chamber. Ceramic and vitreous materials have come to be considered particularly valuable for such heat exchanger applications, both because the materials may be compounded to have satisfactory low coefficients of thermal expansion and because the materials have a long life under the conditions encountered in regenerative heat exchanger operation. Certain heat exchanger structures found useful in the prior art employ bodies of ceramic or vitreous materials which are of a honeycomb or cellular structure and are provided with openings through which the fluids involved in the heat transfer may flow. Of such heat exchanger bodies, some forms employ radially directed openings, in order that the gases involved in the heat transfer may pass along a radial line through a cylindrical or annular heat exchanger body.

The manufacture of honeycomb or cellular ceramic or vitreous material heat exchanger structures of this last type, in which the openings are radially directed, has previously involved a number of separate fabrication steps, such as forming substantially planar annular members and stacking a number of these members to obtain the desired height for the radial flow heat exchanger body.

It is an object of this invention to provide a method of making ceramic or vitreous articles useful as regenerative heat exchanger bodies.

A second object of this invention is to provide an apparatus for the manufacture of ceramic or vitreous regenerative heat exchanger bodies.

A further object of this invention is to produce regenerative heat exchanger bodies for radial flow heat exchangers.

A further object of this invention is to produce ceramic or vitreous bodies for use as heat exchanger elements in radial flow regenerative heat exchangers by operating on a ribbon-like strip of suitable material.

This invention may be characterized as involving the production of a ceramic or vitreous body having radially directed openings and suitable for use as a regenerative heat exchanger element by operations performed on a ribbon of a suitable ceramic or vitreous material. The ceramic material may be extruded or otherwise produced in a strip or ribbon of transverse varying thickness. The strip is then reduced to a transverse constant thickness, causing the strip to assume a curved form. The curved strip is corrugated and then wound about a mandrel so as to form a helically wound cylindrical body having radially directed openings.

The present invention may be easily understood when described in conjunction with the accompanying drawings, in which:

FIGURE 1 is a top view of a first embodiment of an apparatus for the manufacture of ceramic articles;
FIGURE 2 is a side view of a set of form rolls, taken along the line 2—2 of FIGURE 1;
FIGURE 3 is a side view of a set of taper rolls, taken along the line 3—3 of FIGURE 1;
FIGURE 4 is a perspective view of the product of the apparatus of FIGURE 1;
FIGURE 5 is a top view of a second embodiment of an apparatus for the manufacture of ceramic articles;
FIGURE 6 is a perspective view of a product of the apparatus of FIGURE 5;
FIGURE 7 illustrates one modification of a product from the apparatus of FIGURE 5.

Turning first to the apparatus illustrated in FIGURE 1 as one embodiment of the present invention, a regenerative heat exchanger body 10 may be formed by helically winding about a mandrel 11 two strips of a suitable ceramic or vitreous material formed in a manner to be described. The material chosen for the manufacture of the rengenerator body 10 should be one suitable for the forming process of this invention and suitable for the use to which the regenerator body 10 is to be put. One suitable ceramic composition may be made of seventy-five parts by weight of petalite and twenty-five parts by weight of a glass-ceramic having the following approximate composition by oxide analysis in weight percent: 70 percent $SiO_2$, 18 percent $Al_2O_3$, 5 percent $TiO_2$, 3 percent $Li_2O$, 3 percent $MgO$ and 1 percent $ZnO$. Another suitable ceramic material may employ 28 percent, by weight, of beta spodumene and 72 percent petalite, with a binder such as a polyethylene glycol. These ceramic materials involve inventions distinct from the method and apparatus to which this specification is directed, form no part of the present invention, and are subject to protection under U.S. Patent 3,096,159—Van Cott assigned to the assignee of the present invention.

A suitable vitreous material for use in practicing the present invention may be compounded from the system $Li_2O \cdot Al_2O_3 \cdot SiO_2 \cdot TiO_2$. One specific example of a glass within this system which finds usefulness in practice of the present invention is a glass having the following composition: $SiO_2$, 45.5 percent; $Al_2O_3$, 38.1 percent; $Li_2O$, 9.2 percent; $TiO_2$, 3.25 percent; $Na_2O$, .15 percent; $SnO_2$, 3.8 percent; and F, 1.8 percent.

Regardless of the choice of a ceramic or vitreous material for use in conjunction with the method and apparatus of this invention, provision should be made for supplying the material to the apparatus in approximately at ribbon form. Where a ceramic material is employed, the nonplastic material may be formed into a plastic ribbon by adding a binder-plasticizer-solvent mixture which will permit extruding the ceramic material. Preferably, high extrusion pressures and low solvent content are employed, in order to minimize shrinkage on firing. As an alternative, ceramic material may be provided in ribbon form by coating a carrier strip with a slurry. One such method is detailed in Patent 3,112,184—Hollenbach, assigned to the assignee of the present invention, and suggests that a suspension of a pulverized ceramic material and a binder may be applied to a flexible carrier such as a paper. When a vitreous material is to be employed, a ribbon may be drawn from a source of molten glass.

In order to form a regenerator body 10 by helically winding it about a mandrel 11, in accordance with this invention, two ribbons 12, 13 of a suitable ceramic or vitreous material are supplied from any suitable source (not shown). Following the course of only one ribbon 12, the ribbon is passed through a set of form rolls 14 mounted so as to produce a substantially flat ribbon having a precise and definite shape.

As best illustrated in FIGURE 2, the form rolls 14 are mounted with their axes of rotation slightly skewed, thus presenting a working opening of a varying height between the cylindrical members. As illustrated, the left side of the rolls in FIGURE 2 is more closely placed than the right side. The ribbon of material produced from these form rolls 14 thus has a transverse varying thickness from the least thick point at the left side of the rolls in FIGURE 2, to the most thick point at the right side of the rolls. As may be noted from the top view in FIGURE 1, the form rolls 14 are so positioned that the least thick side of the ribbon 12, having a transverse varying thickness, is the side adjacent the mandrel 11 on which the regenerator body 10 is to be helically wound.

The substantially planar ribbon 12 of material having a transverse varying thickness is next passed to a set of tapered rolls 16. Each member of this roll set is of conical form and, as illustrated in FIGURE 3, the members are mounted with their axes of rotation skewed. The members are mounted so that the clearance space or working distance between the faces of the roll members is substantially constant across the transverse width of the set. Due to the constant transverse clearance of the tapered roll set 16, the ribbon 12 of material having a transverse varying thickness, is reduced to a transverse contant thickness. As may be understood, the greater reduction required at the thicker edge of the ribbon, in conjunction with the difference in peripheral speed of the roll surfaces across the width of the tapered roll set 16, results in turning the ribbon 12 about a point in the plane containing the centers of rotation of the roll members. With proper design dimensions, the ribbon 12 is turned on a radius to engage the periphery of the mandrel 11, and be helically wound about the mandrel.

The ribbon 12 as wound around the mandrel 11, is so positioned that the width of the ribbon defines the radial depth or thickness of the regenerator body 10. The regenerator body thus is formed as a helically wound cylindrical construction of any appropriate axial length. Radial flow regenerative heat exchangers may be constructed by employing a desired thickness portion of the helically wound cylinder.

In order to provide the radially directed passages for flow of gases required when portions of the helically wound regenerator body 10 are to be employed in radial flow heat exchangers, the present invention provides for special forming of a ribbon of ceramic or vitreous material. Sets of rolls similar to those employed to produce a planar ribbon 12, as outlined above, generate a corrugated ribbon which is helically wound to provide the required radial openings. As illustrated in FIGURE 1, a second ribbon 13 of a suitable ceramic or vitreous material may be drawn from a suitable source (not shown). This ribbon 13 is reduced, by a set of form rolls 15, to a substantially planar ribbon of transverse varying thickness, in precisely the manner employed to shape the first ribbon 12. The tapered roll 17 to which the second ribbon 13 is fed are provided with corrugated surfaces, rather than planar surfaces, but are otherwise similar to the tapered flat rolls 16 which reduce the first ribbon 12 to a uniform thickness. The tapered crimp rolls 17, in addition to reducing the second ribbon 13 to a constant transverse thickness, form the ribbon into sinuous corrugations while delivering the ribbon to the mandrel 11 for helical winding.

The two ribbons 12, 13 when helically wound on the mandrel, are placed in such juxtaposition as to cause portions of the corrugations in the second ribbon 13 to contact and adhere to the adjacent layers of the planar ribbon 12. This adherence of the corrugations to the planar surface causes the helically wound cylindrical regenerator body 10 to have the required rigidity, while the corrugations define the radially directed channels for the flow of gases.

As is understood, adherence of portions of the two ribbons 12, 13 as they are laid up about the mandrel 11, to form the helical wound body is of substantial importance. In order to assure adherence between adjacent ribbons, it may well be found advisable to prevent a vitreous material from cooling to a nonformable state (i.e., below its softening temperature). Conventional apparatus for reheating vitreous material can be employed between forming rolls 14, 15 and tapered rolls 16, 17 for this purpose. However, forming rolls 14, 15 and tapered rolls 16, 17 should be kept cooled to below about 600° F. to avoid sticking of the hot vitreous material to the rolls. When a nonplastic ceramic material is employed, by adding a binder-plasticizer-solvent mixture, adhesion may be promoted by wetting the portions of the corrugations that are to contact the adjacent layer with a slurry of the mixture immediately before laying up the helix, and after the ribbons have passed through the tapered rolls.

The product of the apparatus of FIGURE 1, as illustrated in FIGURE 4, is formed with alternate courses of the planar ribbon 12 and the corrugated ribbon 13. Radially directed passages 18 are defined by adjacent corrugations of the corrugated ribbon 13 and one surface of the planar ribbon 12. Adhesion between adjacent courses permits fusion of the helically laid up structure into a unitary body.

This invention does not require the use of alternate corrugated and planar courses, however. As may be seen from FIGURES 5 and 6, a radial flow regenerator body 19 may be formed in accordance with this invention without requiring the use of alternate planar and corrugated courses. As illustrated there, a single ribbon 20, of a suitable ceramic or vitreous material, is drawn from any suitable source (not shown), and formed by a set of forming rolls 21 into a ribbon of transverse varying thickness. The forming rolls 21 are similar to forming rolls 15, 16 employed in the apparatus of FIGURE 1. The ribbon 20 of transverse varying thickness is next fed to a set of tappered crimp rolls 22, similar to the tapered rolls 16, 17 of FIGURE 1, which reduce the ribbon 20 to a transverse constant thickness and curve the ribbon about the mandrel. The tapered rolls 22 also corrugate the ribbon 20.

In order to assure that the radially directed openings are properly formed in the radial flow regenerator body 19 laid up from the single ribbon 20, the dimensions of the corrugations formed by the tapered rolls 22, are carefully correlated to the diameter of the mandrel and of the finished body 19. The correlation is such that the corrugations of adjacent courses formed from the single ribbon 20 do not coincide. This is most clearly illustrated in FIGURE 6 where the product of the single ribbon apparatus is illustrated.

While dimensions of the apparatus and finished product may vary depending on the application of the product and the material chosen, the dimensions chosen for one apparatus will be noted in detail. In one apparatus constructed in accordance with FIGURE 1, the mandrel has a diameter of 16 inches, while the regenerator body has an outside diameter of 24 inches. The cylindrical form rolls have a diameter of 3 inches, and are set to have a working clearance varying from .008 inch at the most closely placed edge to .012 inch at the least closely placed edge. The tapered rolls have diameters of 4 inches at the small end and 6 inches at the large end, and are set to have a working clearance of .008 inch.

It should be understood that, while both the single ribbon and two ribbon apparatus have been illustrated as employing corrugations in a sinuous form, this invention is not limited to that form. A modified product, as illustrated in FIGURE 7, might employ a ribbon formed with spaced projections 24 extending outwardly from one or both sides of a substantially planar main ribbon body 25. As may appear, ribbons formed with projections of this type might be employed with either single ribbon or multiribbon apparatus. Further, corrugations formed in the ribbons need not be sinuous, but might assume any other desired shape, such as triangular, or square. The term "corrugations" as used in the claims includes a construction such as shown in FIG. 7.

While this invention has been described with reference to particular materials which may be employed or particular apparatus details, it is recognized that other modifications might be made without exceeding the true scope of this invention. For that reason, the illustrations are not to be considered as limitations and the scope of this invention is determined only by the appended claims.

What is claimed is:

1. A method of making a ceramic or vitreous article comprising; supply a ribbon of a ceramic or vitreous working material which differs in thickness across the width of the ribbon from a thin edge of the ribbon gradually to a thicker edge of the ribbon, directing the ribbon of differing thickness to a winding zone with the thickest edge of the ribbon the greatest distance from the center of the winding zone, applying pressure to at least the thickest portion of the ribbon to reduce the thickness of the thickest edge of the ribbon until the ribbon has the same thickness across the width and thereby impart curvature to the ribbon and helically wind the ribbon in the winding zone, and adhering adjacent courses of the ribbon together to form a unitary structure.

2. A method as in claim 1, further comprising: supplying the working material in the form of an extruded nonplastic ceramic mixed with a binder-plasticizer-solvent mixture, and sintering the adhered ribbon to form a unitary structure.

3. A method as in claim 1, further comprising: supplying the working material in the form of a suspension of pulverized ceramic and a binder on a flexible carrier, and sintering the adhere ribbon to form a unitary structure.

4. A method as in claim 1, further comprising: supplying the working material in the form of a vitreous material drawn from a molten pool.

5. A method of making a ceramic or vitreous article comprising; supplying at least two ribbons of working material each of which differs in thickness across the width of the ribbon from a thin edge portion to a thick edge portion, directing the ribbons to a winding zone with the thickest edge portion of each ribbon the greatest distance from the center of the winding zone, applying pressure to at least the thickest portion of each ribbon to corrugate one of the ribbons and to reduce the thickness of the thickest portion of each ribbon until the ribbon has the same thickness across the width and thereby impart curvature to each ribbon and helically wind the ribbons in the winding zone, and adhering adjacent courses of the ribbons together to form a unitary structure.

6. An apparatus for making ceramic or vitreous articles comprising; a first forming means for forming a ribbon of ceramic or vitreous material into a ribbon which differs in thickness across the width of the ribbon from a thin edge portion of the ribbon to a thick edge portion of the ribbon, a second forming means for applying pressure to the ribbon to simultaneously corrugate and reduce the ribbon to a ribbon having the same thickness across its width and thereby impart a curvature to the ribbon and helically wind said ribbon, and a winding mandrel adjacent the second forming means upon which the ribbon may be helically wound to form a cylindrical body.

7. An apparatus as in claim 6, in which: said first forming means comprises a set of cylindrical roll members mounted to have a working clearance varying across the width of the set.

8. An apparatus as in claim 7, in which: said second forming means comprises a set of tapered roll members mounted to have a working clearance constant across the width of the set.

9. An apparatus for making ceramic or vitreous articles comprising; a first forming means for producing a ribbon of material which differs in thickness across its width from a thin edge portion to a thick edge portion, a second forming means for applying pressure to the ribbon to simultaneously corrugate and reduce the thick edge portion until the ribbon has the same thickness across the width and thereby impart curvature to the ribbon and helically wind said ribbon, a third forming means for forming a second ribbon of material which differs in thickness across the width of the ribbon from a thin edge portion to a thicker edge portion, a fourth forming means for applying pressure to the second ribbon of material to reduce the thicker edge portion until the ribbon has the same thickness across the width and thereby impart curvature to the ribbon and helically wind said ribbon, a mandrel adjacent the second and fourth forming means about which the first and second ribbons are helically wound adjacent one another to form a unitary cylindrical body.

10. An apparatus as in claim 9, in which: said first forming means comprises a set of cylindrical roll members mounted to have a working clearance varying across the width of the set.

11. An apparatus as in claim 9, in which: said second forming means comprises a set of tapered roll members mounted to have a working clearance constant across the width of the set.

References Cited by the Examiner

UNITED STATES PATENTS

| | | | |
|---|---|---|---|
| 1,766,680 | 6/1930 | Parham | 65—92 |
| 2,042,537 | 6/1936 | Liddell | 210—497.1 |
| 2,654,124 | 10/1953 | Layte | 264—210 |
| 2,719,566 | 10/1955 | Blatt | 156—205 |
| 2,978,227 | 4/1961 | Hess | 165—8 |
| 3,112,184 | 11/1963 | Hollenbach. | |

DONALL H. SYLVESTER, *Primary Examiner.*

G. R. MYERS, *Assistant Examiner.*